United States Patent
Van Straten

(10) Patent No.: US 12,202,441 B2
(45) Date of Patent: Jan. 21, 2025

(54) SOLAR PANEL AND ARTICULATING CARGO CARRIER

(71) Applicant: Van Straten Enterprises, Inc., Chassell, MI (US)

(72) Inventor: George Van Straten, Chassell, MI (US)

(73) Assignee: Van Straten Enterprises, Inc., Chassell, MI (US)

( * ) Notice: Subject to any disclaimer, the term of this patent is extended or adjusted under 35 U.S.C. 154(b) by 162 days.

(21) Appl. No.: 18/107,394

(22) Filed: Feb. 8, 2023

(65) Prior Publication Data

US 2023/0249625 A1 Aug. 10, 2023

Related U.S. Application Data

(60) Provisional application No. 63/342,080, filed on May 14, 2022, provisional application No. 63/308,194, filed on Feb. 9, 2022.

(51) Int. Cl.
| | |
|---|---|
| *B60R 9/045* | (2006.01) |
| *B60R 9/055* | (2006.01) |
| *B60R 9/06* | (2006.01) |
| *B60R 9/10* | (2006.01) |
| *B60R 16/033* | (2006.01) |
| *H02S 10/40* | (2014.01) |
| *H02S 30/20* | (2014.01) |
| *H02S 40/12* | (2014.01) |
| *H02S 40/38* | (2014.01) |

(52) U.S. Cl.
CPC .............. *B60R 9/045* (2013.01); *B60R 9/055* (2013.01); *B60R 9/06* (2013.01); *B60R 9/10* (2013.01); *B60R 16/033* (2013.01); *H02S 10/40* (2014.12); *H02S 30/20* (2014.12); *H02S 40/38* (2014.12); *H02S 40/12* (2014.12)

(58) Field of Classification Search
CPC .................................. B60R 9/045; B60R 9/10
USPC ......................................................... 224/310
See application file for complete search history.

(56) References Cited

U.S. PATENT DOCUMENTS

| | | | |
|---|---|---|---|
| 9,605,880 B2 * | 3/2017 | Van Straten | H02S 40/12 |
| 10,077,574 B1 * | 9/2018 | Currid | B60P 3/343 |
| 10,630,100 B2 * | 4/2020 | Van Straten | H02J 7/35 |
| 10,819,272 B2 * | 10/2020 | Kim | G02B 5/003 |
| 10,947,753 B2 * | 3/2021 | Currid | E04H 15/06 |
| 11,279,210 B2 * | 3/2022 | Kim | G02B 5/003 |
| 11,608,654 B2 * | 3/2023 | Currid | B60P 3/343 |

(Continued)

FOREIGN PATENT DOCUMENTS

| | | | |
|---|---|---|---|
| CN | 105569429 A | * | 5/2016 |
| CN | 205498732 U | * | 8/2016 |

(Continued)

*Primary Examiner* — Justin M Larson
(74) *Attorney, Agent, or Firm* — Wells St. John P.S.

(57) ABSTRACT

A vehicle bed deployable solar power unit and cargo hauler assembly includes an articulating platform frame, a solar panel and a cargo carrier. The solar panel is carried by the articulating frame moveable between a stowed position and a deployed position. The cargo carrier is supported by the articulating platform frame movable relative to the solar panel to prevent operational interference between the solar panel in articulated positions and the cargo carrier. A method is also provided.

20 Claims, 10 Drawing Sheets

(56) References Cited

U.S. PATENT DOCUMENTS

| | | | |
|---|---|---|---|
| 11,751,290 B2 * | 9/2023 | Adler | H05B 3/26 |
| | | | 136/251 |
| 2021/0380042 A1 * | 12/2021 | Jonsson | B60R 9/045 |
| 2023/0140222 A1 * | 5/2023 | Van Straten | H01L 31/0488 |
| | | | 296/97.1 |
| 2023/0249625 A1 * | 8/2023 | Van Straten | H02S 30/20 |
| | | | 224/314 |
| 2024/0278730 A1 * | 8/2024 | Voss | B60R 9/058 |

FOREIGN PATENT DOCUMENTS

| | | | | |
|---|---|---|---|---|
| CN | 107891820 A | * | 4/2018 | |
| CN | 108457521 A | * | 8/2018 | ............ E04H 15/06 |
| CN | 110385999 A | * | 10/2019 | |
| CN | 111660824 A | * | 9/2020 | |
| KR | 101793056 B1 | * | 11/2017 | |
| WO | WO-2023193040 A1 | * | 10/2023 | |

\* cited by examiner

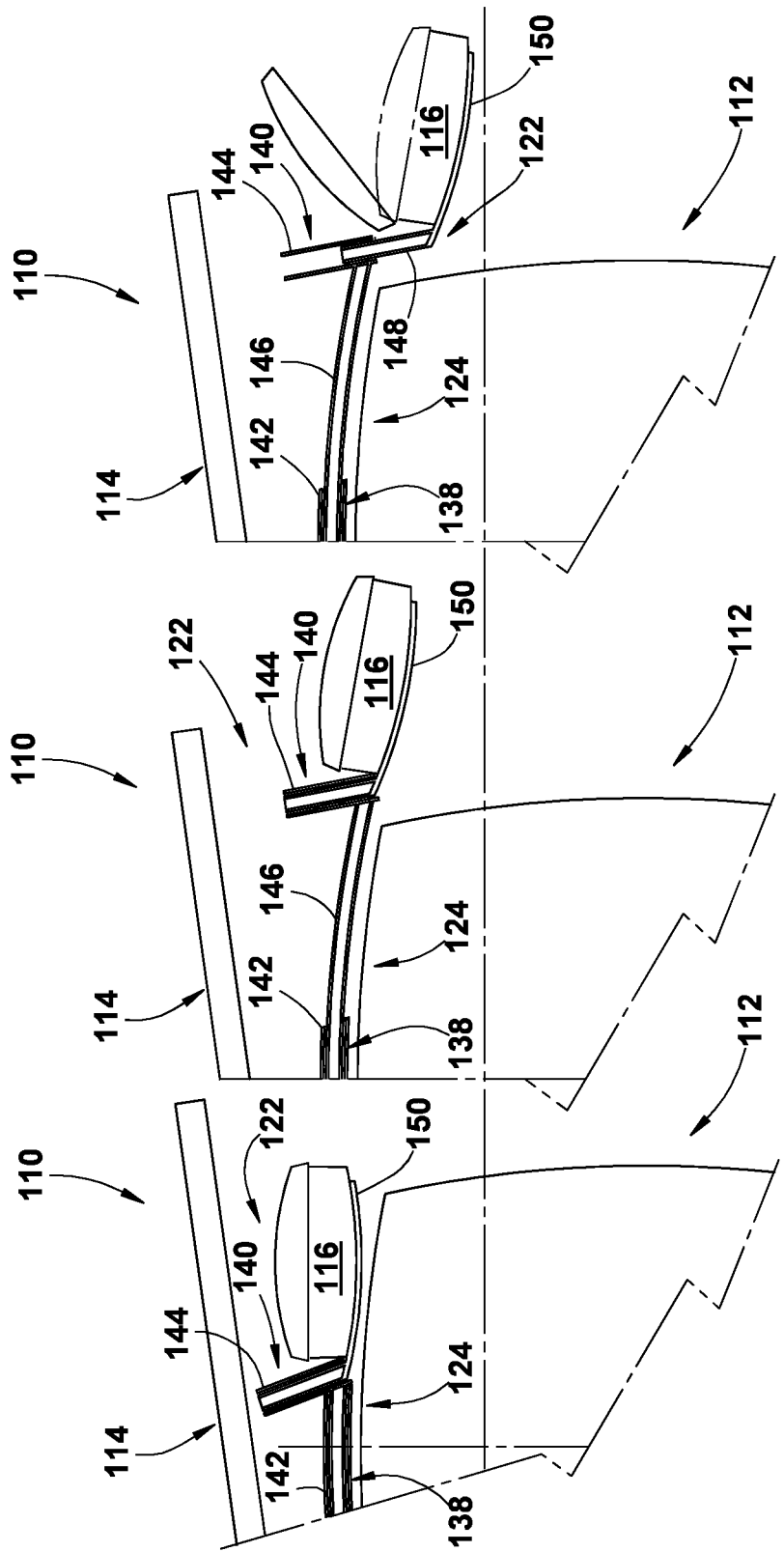

SOLAR PANEL AND ARTICULATING CARGO CARRIER

CROSS REFERENCE TO RELATED APPLICATIONS

This patent application claims priority to and the benefit of U.S. Provisional Patent Application Ser. No. 63/308,194, filed Feb. 9, 2022; and further claims priority to and the benefit of U.S. Provisional Patent Application Ser. No. 63/342,080, filed May 14, 2022; the entirety of each of which is incorporated by reference herein.

TECHNICAL FIELD

This disclosure relates to solar cells, photovoltaic (PV) modules, and solar power units configured for deployment on a vehicle in combination with cargo hauling capabilities. This disclosure pertains to deployable solar power units and cargo hauler assemblies including heated solar panels.

BACKGROUND OF THE INVENTION

Techniques are known for providing solar power to battery systems including battery systems provided on vehicles. Vehicles also include platforms and beds provided to haul cargo. Techniques are also known for charging batteries using solar panels. Inclusion of solar charging systems on a vehicle can interfere or erode ability to carry certain kinds of cargo as they take away from a footprint used to haul cargo and can interfere with one another especially when deployed. There is also a need to improve solar panel use where condensate occlusion can interfere with operation, such as from frost, snow, ice, moisture, dew or precipitation. Improvements are needed to make such charging and hauling capabilities more efficient and compatible.

SUMMARY OF THE INVENTION

A deployable solar power unit and a cargo hauler assembly are provided for use on a vehicle bed. Furthermore, such assembly is provided for hauling or carrying sports equipment in addition to collecting solar energy, such as with one or more bicycle or e-bike racks, SUP racks, kayak racks, ski racks, surfboard racks, or racks for any other sports equipment transported and/or stowed by a user of the vehicle.

According to one aspect, a vehicle bed deployable solar power unit and cargo hauler assembly includes an articulating platform frame, a solar panel and a cargo carrier. The solar panel is carried by the articulating frame moveable between a stowed position and a deployed position. The cargo carrier is supported by the articulating platform frame movable relative to the solar panel to prevent operational interference between the solar panel in articulated positions and the cargo carrier.

According to another aspect, vehicle deployable solar power unit and cargo carrier assembly is provided having an articulating frame, a solar panel and a cargo carrier. The solar panel is carried on and deployed by the articulating frame between a stowed position and a deployed position. The cargo carrier is supported by the articulating frame movable relative to the solar panel to enable access to the cargo carrier when the solar panel is in the deployed position.

According to yet another aspect, a method is provided ford deploying a solar panel array with a cargo carrier. The method includes providing an articulating platform frame, a solar panel carried by the platform frame, and a cargo carrier carried by the platform frame; articulating the platform frame to deploy the solar panel from a stowed position to a deployed position; articulating the cargo carrier to a deployed position relative to the solar panel to provide access to the cargo carrier; and presenting the solar panel to receive solar energy.

BRIEF DESCRIPTION OF THE DRAWINGS

Preferred embodiments of the disclosure are described below with reference to the following accompanying drawings.

FIG. 9 is a simplified partial front view of the vehicle and solar panel array/cargo carrier assembly showing the solar panel array deployed and the cargo carrier both stowed.

FIG. 10 is a simplified partial front view of the vehicle and solar panel array/cargo carrier assembly showing the solar panel array deployed and the cargo carrier laterally deployed.

FIG. 11 is a simplified partial front view of the vehicle and solar panel array/cargo carrier assembly showing the solar panel array deployed and the cargo carrier laterally and vertically deployed.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
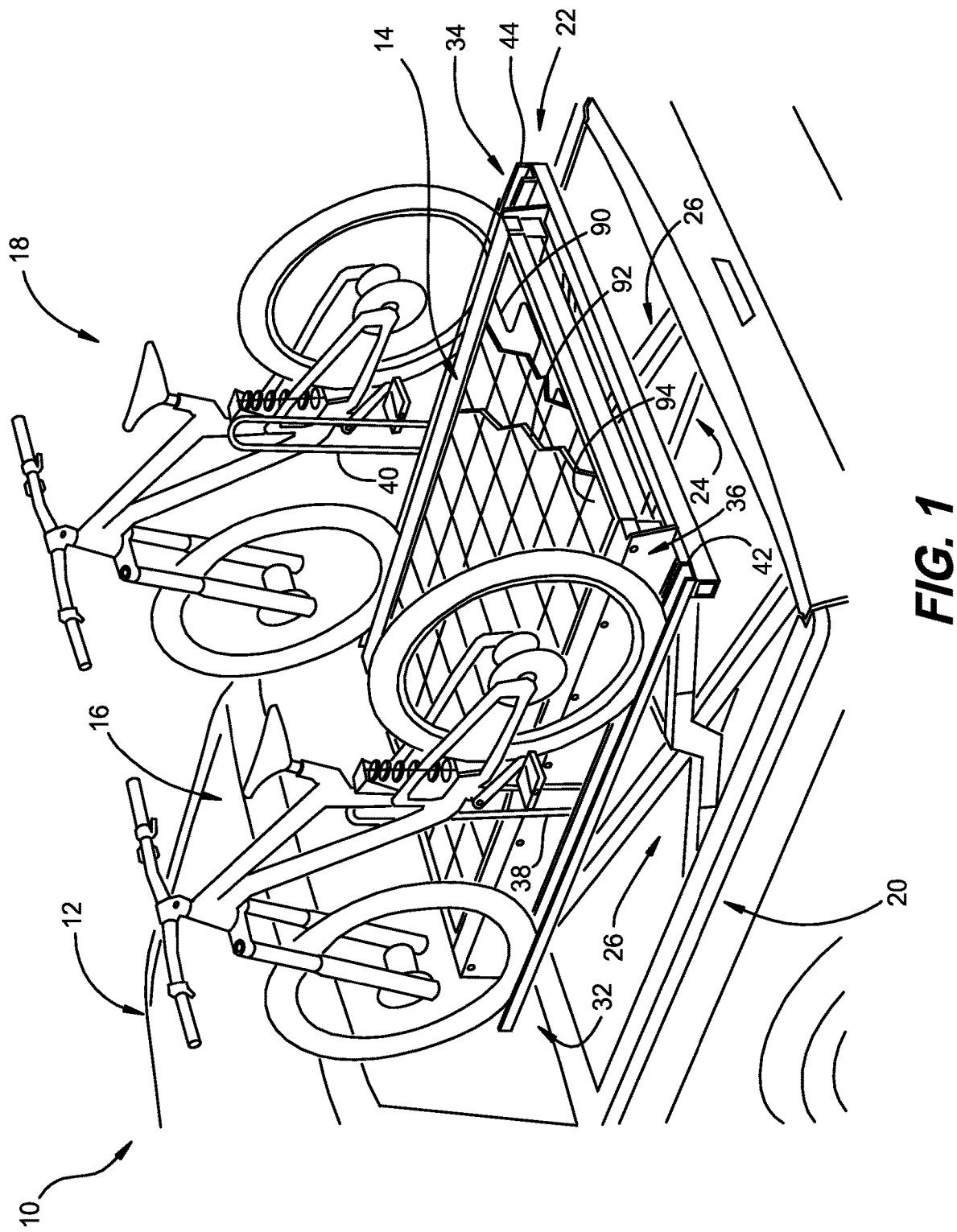
FIG. 1 is a perspective view from above and behind of a vehicle having a bed with an articulating and stowable heated and deployable solar panel array and bike rack showing the solar panel and bike rack in a partially raised position within a vehicle bed.

FIG. 1 is a perspective view from above and behind of a vehicle, or truck 12 having a bed, or truck bed 20 with an articulating and stowable heated and deployable solar panel array and bike rack assembly 10 showing the solar panel array 14 and bike rack 32 and 34 in a partially raised position within a vehicle bed 20. More particularly, solar panel array and bike rack assembly 10 includes a deployable solar panel array 14 and a pair of bike racks 32 and 34 carried by an upper frame 22. Upper frame 22 is carried by an articulating lift frame 26 by a lower frame 24 that is affixed into a vehicle bed 20 with fasteners and/or turnbuckles (not shown) to attachment points in the vehicle bed 20. A pair of bikes, or e-bikes 16 and 18 are removably carried by each bike rack 32 and 34 and are raised and lowered on upper frame 22 as lift frame 26 is articulated by a single lift actuator 50 (see FIG. 4). Solar panel array 14 mounted onto upper frame 22 with a slider frame 36 that extends out three separate solar panels 54, 56 and 58 (see FIG. 2). Panels 54, 56 and 58 are configured so that panels 54 and 58 slide outwardly from a stacked configuration about central panel 56 via slider frame 36 with a set of outboard belts (not shown) that extend and retract the outer panels 54 and 58 relative to stationary center panel 56. Optionally, a single solar panel can be provided similar to panel 56 and a forward and a rearward rolled up flexible solar panel can be unrolled and deployed from the front and rear edges of the single solar panel via a pair of spring wound storage rolls similar to a roller window blind that both extend out to mount onto a sliding frame.

As shown in FIG. 1, each solar panel, such as solar panels 54, 56 and 58 (see FIG. 2) can be heated with an elongate heater 90 that forms a serpentine path about the solar panel beneath or between individual solar cells beneath a top glass 92 having a top surface 94 that is heated to mitigate any condensate occlusion atop glass 92. In one case, a bottom plastic panel of a solar panel has a serpentine groove into which an elongate rope heater 90 is affixed. One such rope heater comprises a Nichrome resistive heating wire covered with a Teflon outer coating, or covering and with electrical connector fittings for receiving electrical current in operation from a wiring harness and power source (not shown).

Bike racks 32 and 34 of FIG. 1 include a pair of longitudinal U-shaped rails 42 and 44 each affixed, or welded onto upper frame 22. Each rail 42 includes an upwardly extending U-shaped tubular frame 38 and 40 respectively affixed, or welded onto rails 42 and 44. A strap or a frame clamp (not shown) as used in the bike rack industry can be affixed anywhere onto each frame 38 and 40 at a location that is proximate a frame tube on a respective bicycle 16 and 18 for affixing such bicycle 16 and 18 onto bike racks 32 and 34. Bike racks 32 and 34 each provide a sports equipment carrier. Optionally, any other form of sports equipment carrier can be provided on system 10 including Stand Up Paddleboard (SUP) racks, kayak racks, ski racks, snowboard racks, or surfboard racks. Furthermore, upper frame 22 can comprise individual tubular segments spaced apart at locations where standard industry brand sports equipment attachments can be mounted to cylindrical tubular frame components or rectangular components, such as Yakima® or Thule® brand-specific mounting brackets configured to affix brand sports equipment accessories for carrying snow sports, watersports, and cycling sporting goods. Yakima® is a U.S. registered trademark of Yakima, 4101 Kruse Way, Lake Oswego, OR 97035. Thule® is a U.S. registered trademark of Thule Group, Fosievägen 13, SE-214 31 Malmö (Sweden).

Figure 2:
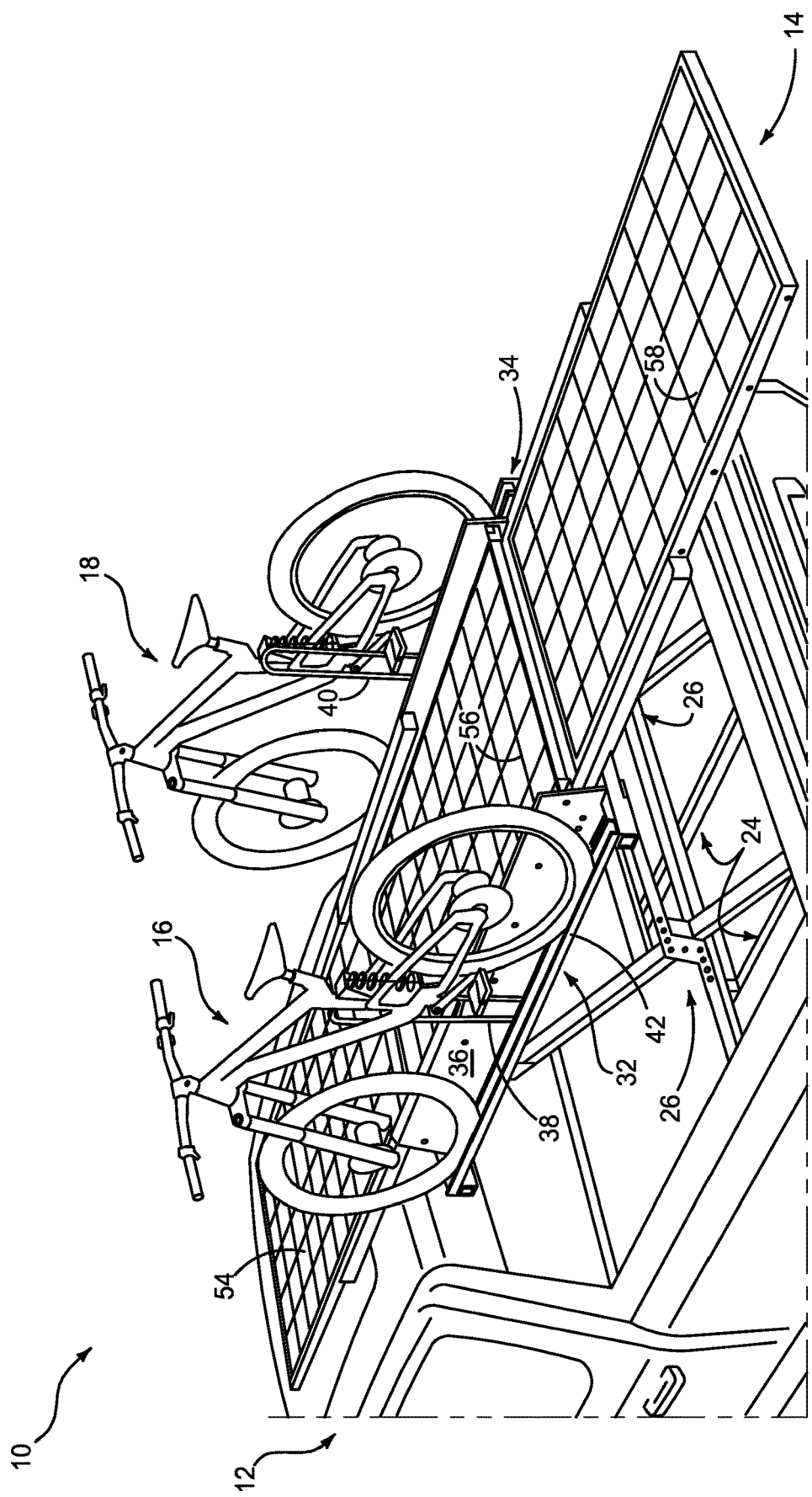
FIG. 2 is a perspective view from above and behind of the vehicle showing the heated solar panel array and bike rack raised and deployed for use from within the bed.

FIG. 2 is a perspective view from above and behind of the vehicle showing the heated solar panel array and bike rack assembly 10 raised and deployed for use from within a bed of truck 12. Mountain bikes 16 and 18 provide sports equipment, or recreational equipment that is removably affixed onto bicycle racks 32 and 34. Optionally, racks 32 and 34 can be configured to carry work equipment such as scooters, ladders, or construction equipment. Lift frame 26 is shown fully raised such that solar panel array 14 and slider frame 36 is raised to a top-most position and solar panels 54 and 58 have been deployed outwardly of stationary solar panel 56 to expose all three solar panels 54, 56 and 58 to collect solar energy. In concert with solar array 14 being raised for deployment, rails 42 and 44 with affixed U-shaped frames 38 and 40 are also raised, elevating bike racks 32 and 34 along with affixed bicycles 16 and 18. Bottom frame 24 is seated within a bottom surface, or bed of truck 12 where it can be affixed to truck 12 with threaded fasteners and/or turnbuckles.

According to one construction, slider frame 36 includes a longitudinal slider track configured to enable sliding extension and retraction of each solar panel 54 and 58 relative to stationary solar panel 56. _____. Opposed side panels, or frames of slider frame 36 each have a top longitudinal u-shaped track in which upper solar panel 54 and lower solar panel 58 slide respectively above and below stationary solar panel 56. A linear actuator assembly having a drive motor with a worm drive gear engages on a drive shaft with a complementary worm gear with discrete timing belts that ride over drive wheels to extend and retrace solar panels 54 and 58 between deployed and stowed positions. Optionally, panels 54 and 58 can be manually deployed by hand by merely sliding panels 54 and 58 relative to panel 56 to open, or deployed positions and closed positions. Further details of one suitable construction are readily understood in the art and detailed in U.S. Pat. No. 10,630,103, incorporated by reference herein in its entirety. Further optionally, a single stationary solar panel 56 can be used.

Figure 3:
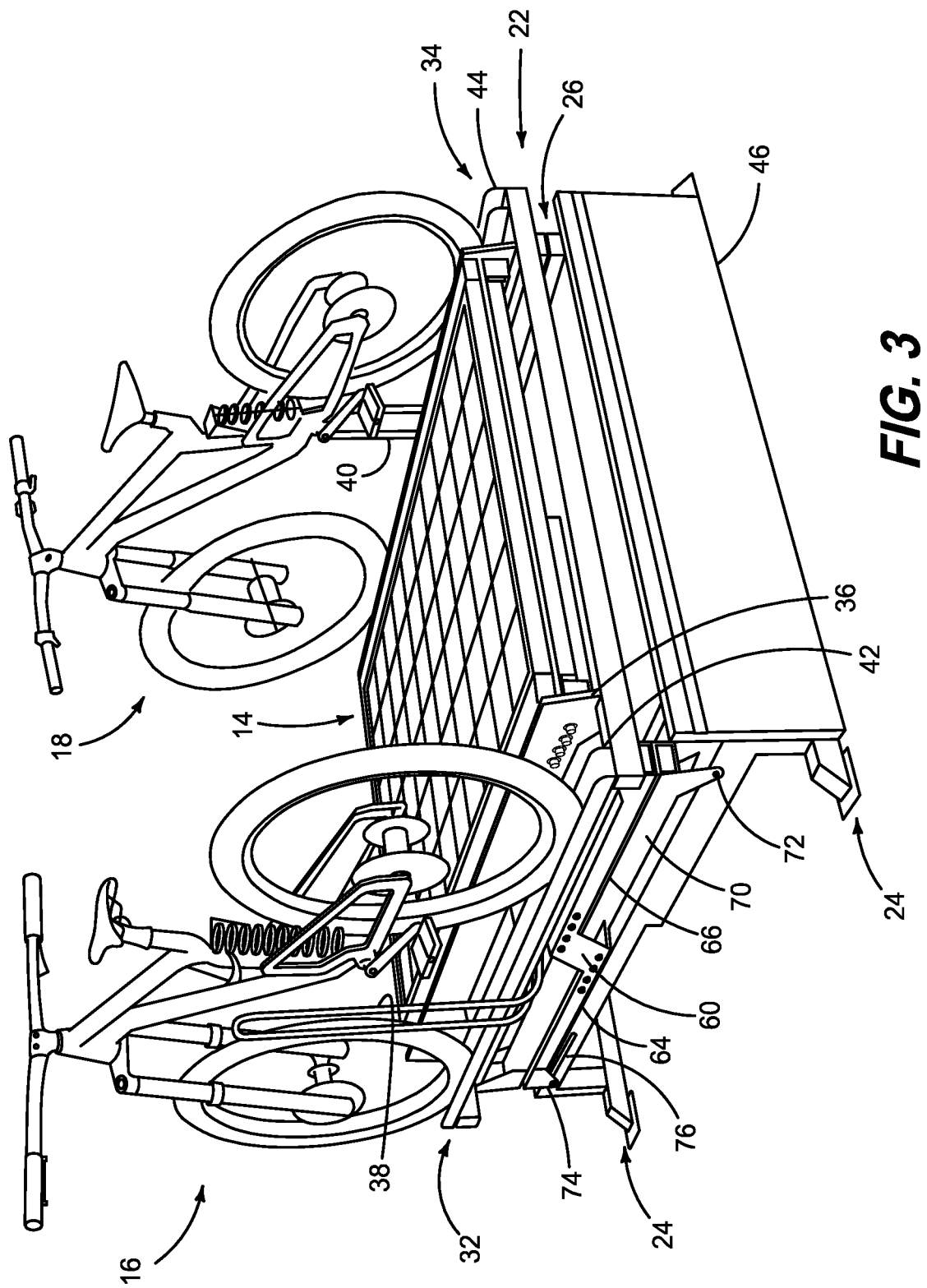
FIG. 3 is a perspective view from above and behind of the articulating and stowable heated deployable solar panel array and bike rack removed from the vehicle bed and shown in a lowered and stowed position.

FIG. 3 is a perspective view from above and behind of the articulating and stowable heated deployable solar panel array and bike rack assembly 10 removed from the vehicle bed 20 for truck 12 (of FIG. 1) and shown in a lowered and stowed position. More particularly, upper frame 22, rails 42 and 44, slider frame 36 and solar array 14, bike racks 32 and 34 (and frames 38 and 40) and bikes 16 and 18 are shown in a lowered, or stowed position. Lift frame 26 is shown completely lowered such that upper frame 22 is nested with lift frame 26 and lower frame 24. Lift frame 26 forms a scissor x-frame on either side of upper frame 22 and lower frame 24. More particularly, a central pivot bolt 60 is provided in each scissor frame of lift frame 26 with a straight rectangular tube member 70 crossing a pair of plate joined offset longitudinal rectangular tube members 64 and 66. Member 70 is affixed at each end to frame 22 and frame 24 with a stationary bolt pivot 72. An offset longitudinal member comprising members 64 and 66 has a stationary bolt pivot 72 with upper frame (see FIG. 4) and a horizontal sliding mount comprising sliding bolt 74 and slot 76 in frame 24. Bolt 74 slides in slot 76 as each x-frame is raised. A drawer 46 is also affixed to slide relative to lower frame 24.

Figure 4:
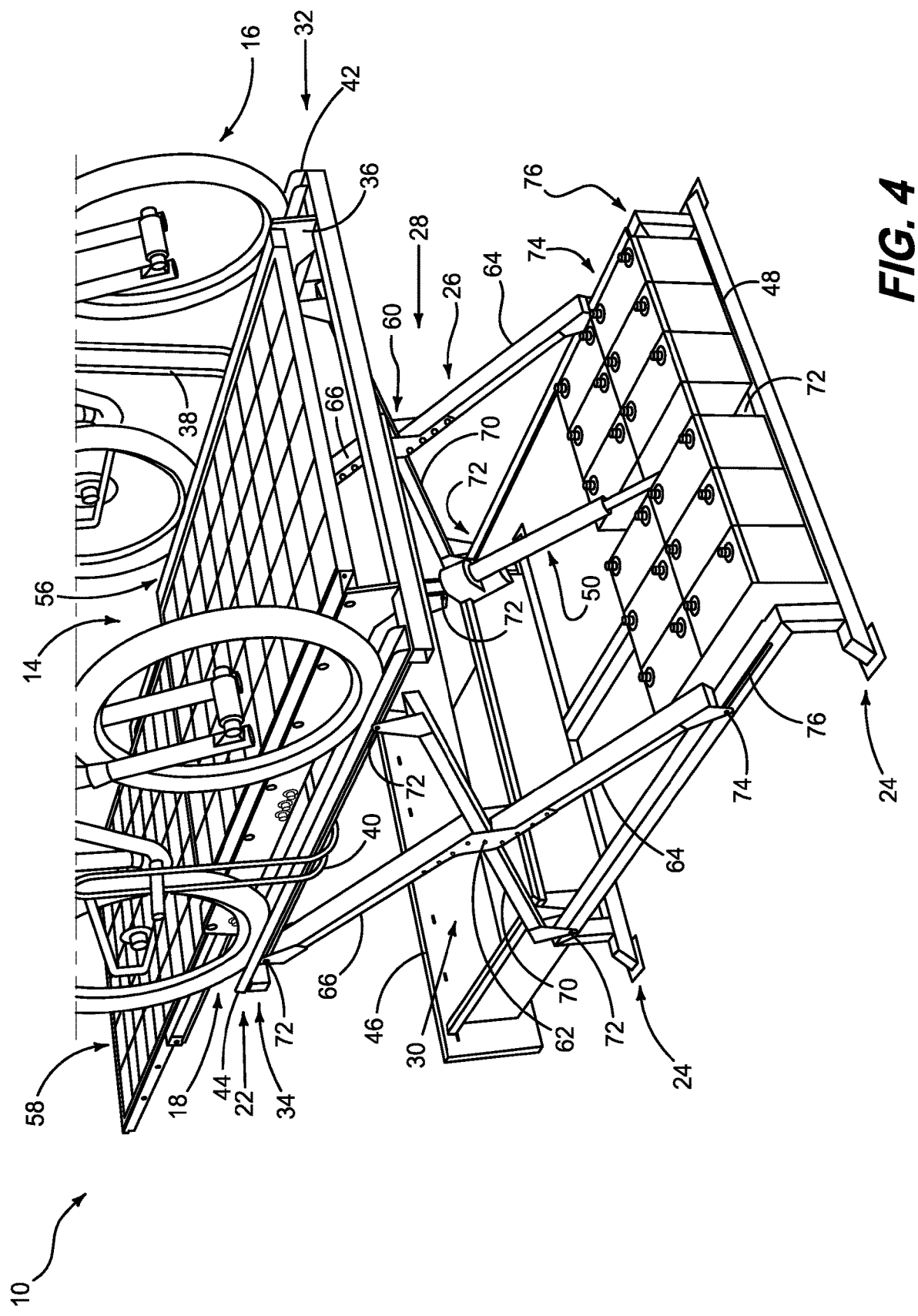
FIG. 4 is a perspective view from above and in front of the articulating and stowable heated deployable solar panel array and bike rack removed from the vehicle bed and shown in a raised and deployed position.

FIG. 4 is a perspective view from above and in front of the articulating and stowable heated deployable solar panel array and bike rack assembly 10 removed from the vehicle bed and shown in a raised and deployed position. More particularly, lift frame 26 comprises a pair of x-frames 28 and 30 that are each raised using an electric solenoid driven threaded actuator 50 that pivots each arm 64, 66 and 70 about pivot bolt 60 and 62, respectively, as stationary pivots, or pivot bolt assemblies 72 rotate in place and slider bolt 74 translates within slots 76 on either vertical face of lower frame 24. Bicycles 16 and 18 on bicycle racks 32 and 34, respectively, are also raised by upper frame 22 along with solar panel array and slider frame 36. By raising bicycles 16 and 18, they do not interfere with raising and deployment of solar panel array 14. Slider frame 36 is shown holding only two solar panels 56 and 58 in FIG. 4, but it is understood that three solar panels are preferred and a forward panel has been removed in this view (to facilitate viewing). Optionally, a single stationary panel can be used, or a pair of panels with one panel sliding out in a horizontal plane for deployment. Optionally, lift frame 26 can be formed with a pair of H-pivot frames having unequal length configured to raise and pitch the surface of deployed solar panels in order to present a surface more perpendicular to a direction of solar energy being captured. Further optionally, a tilt frame mechanism call also be added to pitch the solar panels when deployed. Finally, U-shaped channels, or rails 42 and 44 are formed from aluminum, or metal and are welded onto upper frame 22. Likewise, U-shaped tubes, or posts 38 and 40 are either welded onto rails 42 and 44, or affixed with threaded fasteners.

As shown in FIG. 4, electricity generated by solar panels 56 and 58 of solar panel array 14 is collected as DC current and stored in arrays of batteries 48. A pair of arrays of batteries 48 are shown stowed forward along lower frame 24 behind drawer 48 in order to provide clearance for a screw-driven actuator 50 that is pinned with pivot joint fasteners and pivot joints 72 on lift frame 26 and lower frame 24. Extension of actuator 50 raises upper frame 22, while retraction lowers frame 22. Optionally, a pair of extensible actuators can be provided one on each side outboard of batteries 48. Further optionally, pneumatic or hydraulic pistons or gear racks can be used to actuate lifting and lowering of upper frame 22.

Figure 5:
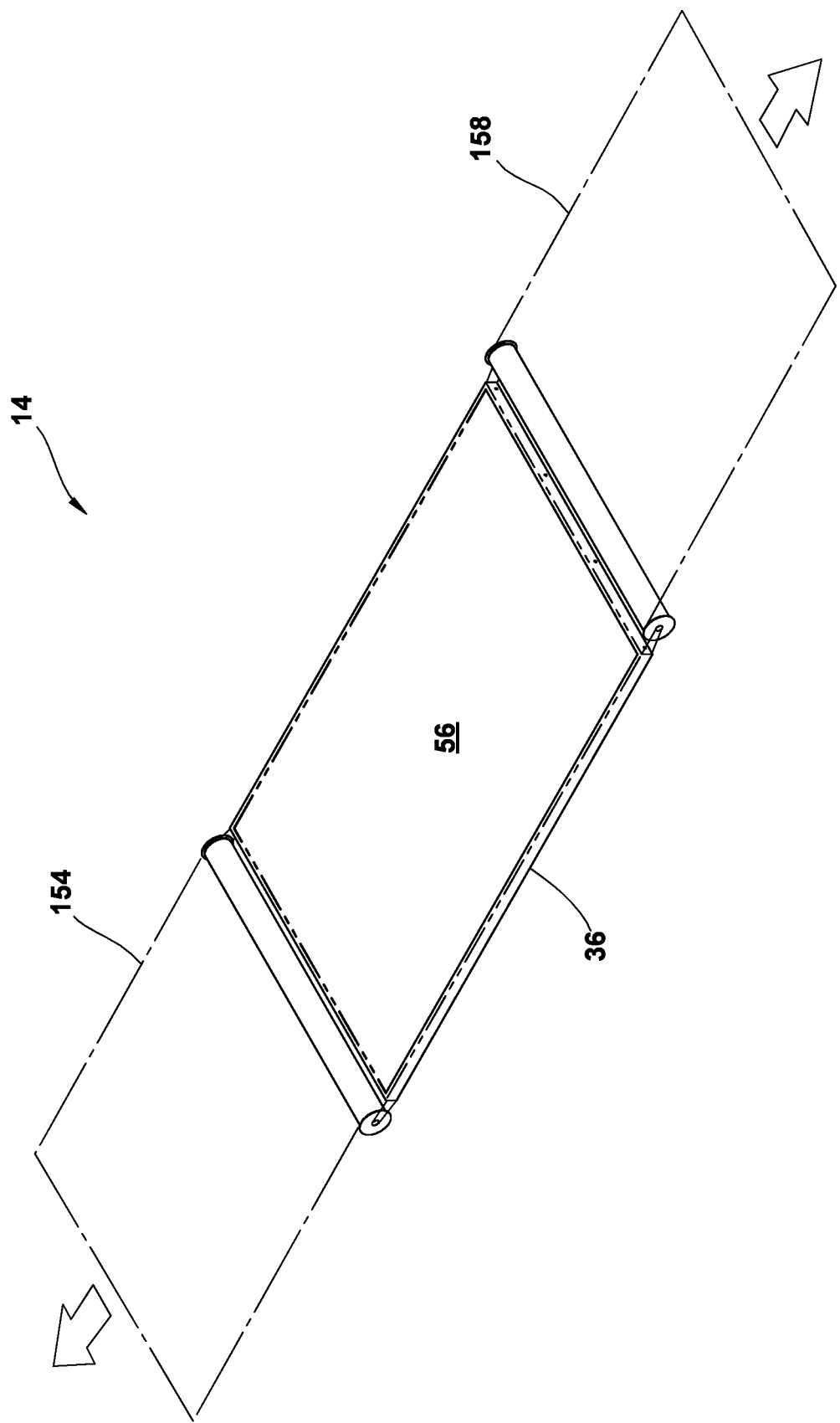
FIG. 5 is a simplified perspective view of an alternative solar panel array including a pair of rolled flexible solar panels in combination with a central rigid solar panel.

FIG. 5 is a simplified perspective view of an alternative solar panel array 14 including a pair of rolled flexible solar panels 154 and 158 in combination with a central rigid solar panel 56 all supported by a deployment frame 36. Optionally, solar panel array 14 can be one or more rolled flexible solar panels deployed, or unrolled across a frame. Each panel 154 and 158 is rolled onto a spring wound cylindrical mandrel, or drum 155 and 159. An internal torsional spring (not shown) is provided within each drum similar to a torsion spring for a garage door opener. Solar panel 56 is a traditional solar panel mounted onto a rigid frame 36.

As shown in FIG. 5, one suitable PV module, or panel 154 and 158 is a bare module, large scale PV module group available from Ascent Solar Technologies, Inc., (www.ascentsolar.com), 12300 Grant St., Thornton, CO 80241-3120 USA. Another suitable PV module is a PowerFilm Solar rollable solar panel available from PowerFilm, Inc. 1287 XE Place Ames, IA 50014 USA. Yet another suitable solar panel is available as an eFlex lightweight and flexible solar panel available from Flisom AG, Gewerbestrasse 16, 8155 Niederhasli, Switzerland.

Figure 6:
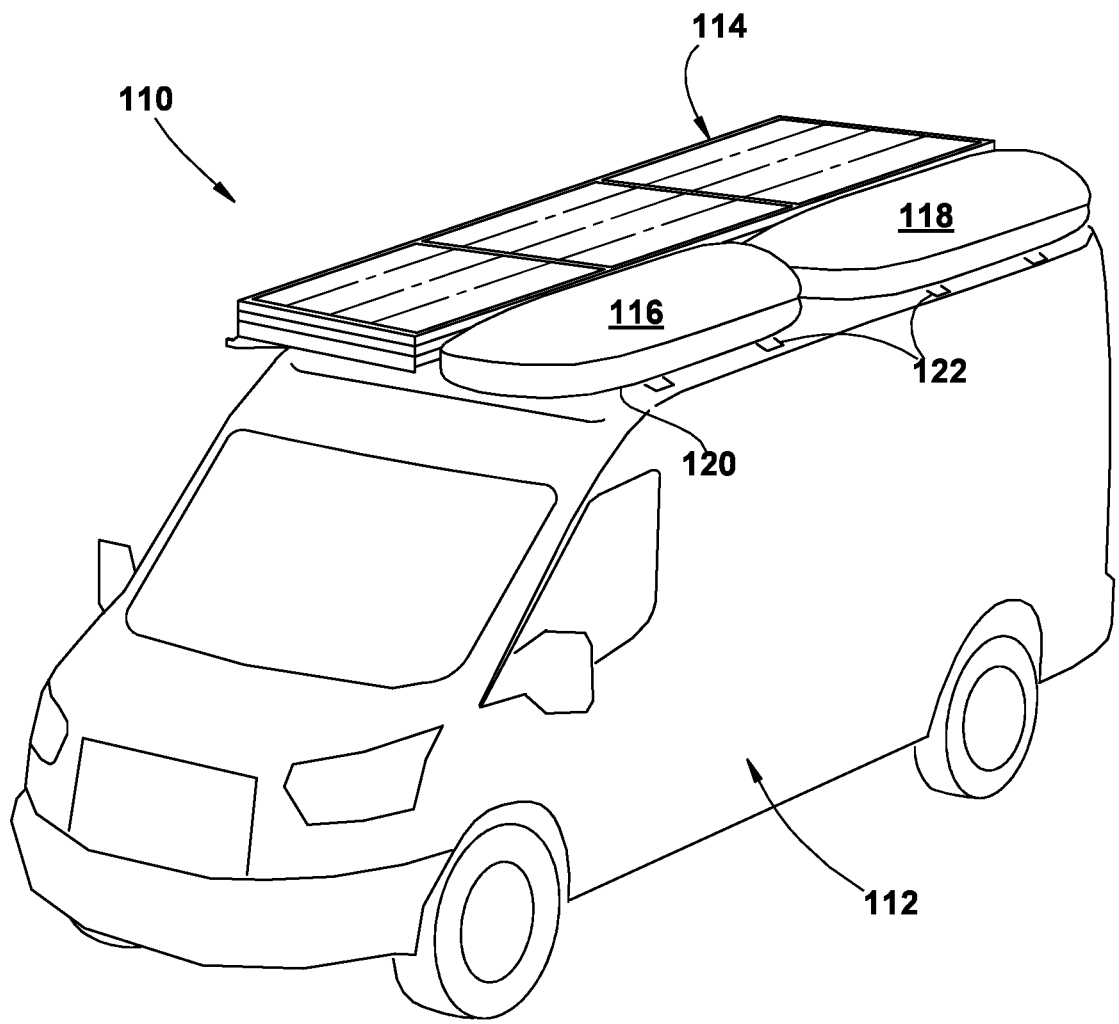
FIG. 6 is a perspective view from above and in front of another vehicle having a roof mounted articulating and stowable heated and deployable solar panel array and cargo rack showing the solar panel and cargo rack in a stowed position on a vehicle roof.

FIG. 6 is a perspective view from above and in front of another vehicle, or van 112 having a roof mounted articulating, stowable, and deployable heated solar panel array and cargo carrier rack assembly 110 showing a solar panel array 114 and a pair of cargo carriers 116 and 118 in a stowed position atop an articulating roof rack assembly, or frame 122 on a vehicle roof 120. Although shown on a van rooftop, or roof 120, it is understood that assembly 110 can be provided on a pickup truck bed, truck platform, car rack, vehicle panel or roof component, or any other suitable support platform or structure on a vehicle.

Figure 7:
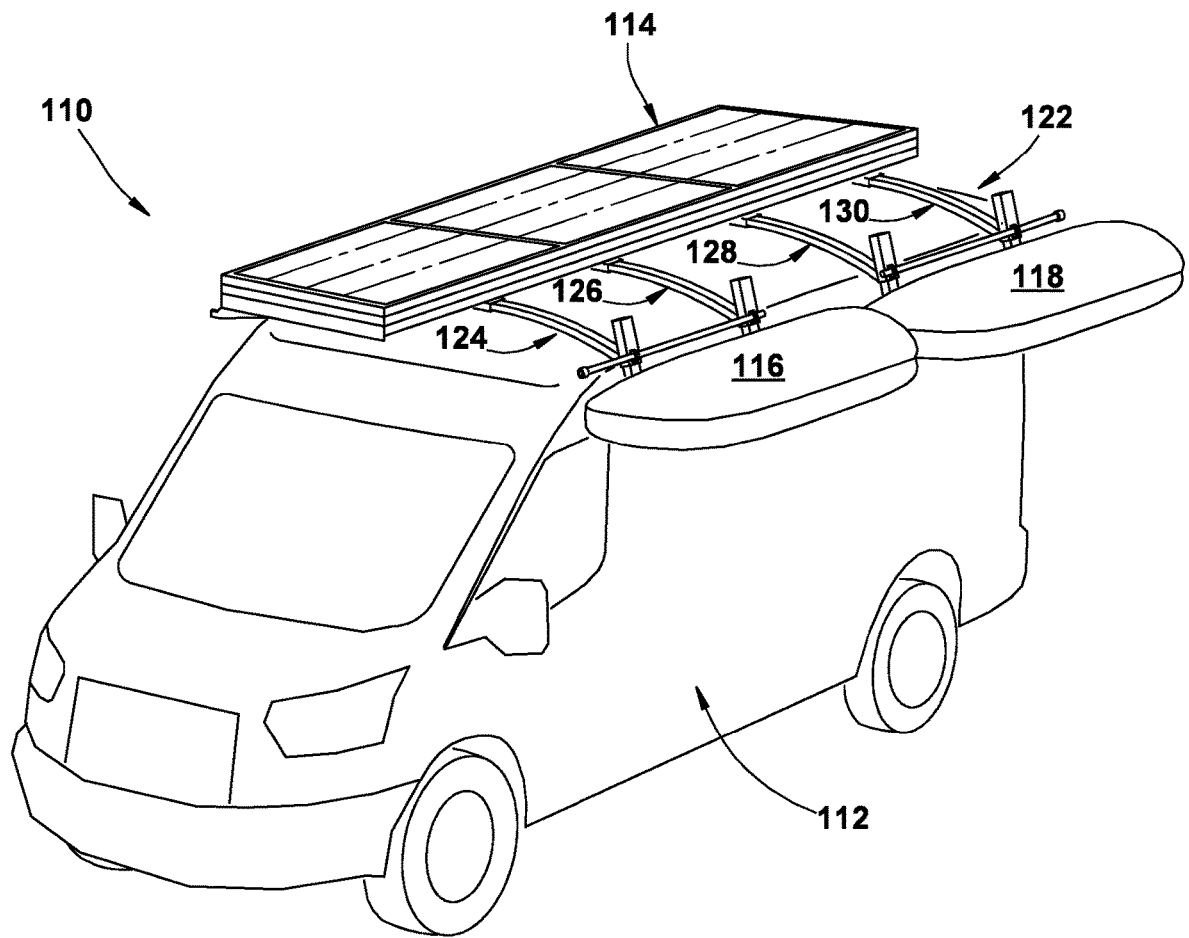
FIG. 7 is another perspective view from above and in front of the vehicle and roof mounted articulating and stowable heated and deployable solar panel array and movable cargo rack of FIG. 6 shown with the cargo rack deployed to a moved position.

FIG. 7 is another perspective view from above and in front of the vehicle roof mounted articulating, stowable, and deployable heated solar panel array and cargo carrier rack assembly 110 of FIG. 6 shown with the cargo carriers 116 and 118 on the articulating roof rack assembly 122 of vehicle 112 in a moved, or deployed position and the solar panel array 114 shown in a stowed position. More particularly, translating, or expansible (capable of being elongated, or extensible) cross-members 124, 126 and 128, 130 each from a horizontal expansible frame member 138 move cargo carriers 116 and 118, respectively along a curved, substantially horizontal outboard path from atop vehicle roof 120. Likewise, cargo carriers 116 and 118 are dropped, or lowered along a mostly vertical path to facilitate opening and access to cargo carriers 116 and 118, particularly when solar panel array 114 is deployed (as shown below in FIGS. 8 and 9-11). A similar set of two pairs of substantially vertical expansible frame members are used to lower and raise each cargo carrier, or box 116 and 118 as shown by example with vertical expansible (or extensible) frame member 140 including vertical outer rectangular tube 144 and vertical inner rectangular tube 148 slidably received within tube 144, as shown in FIG. 11.

Figure 8:
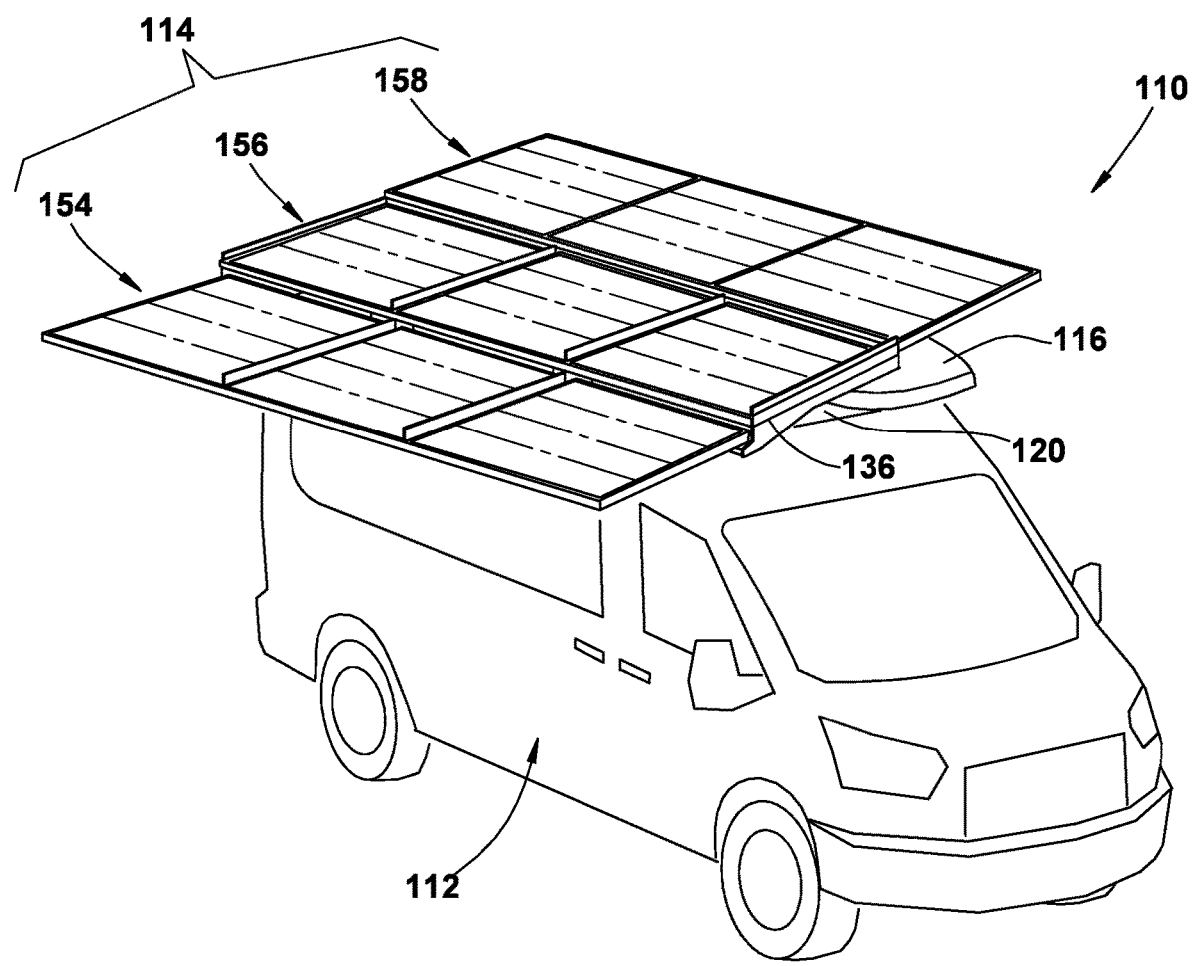
FIG. 8 is another perspective view from above and in front of the vehicle and roof mounted articulating and stowable heated and deployable solar panel array and movable cargo rack of FIGS. 6-7 shown with the solar panel deployed to a moved position.

FIG. 8 is a further perspective view from above and in front of the vehicle roof mounted articulating, stowable, and deployable heated solar panel array and cargo carrier rack assembly 110 of FIGS. 6-7 shown with the solar panel array 114 deployed to a moved, or open position and with cargo carriers, such as carrier 116 in a stowed, or stacked position. Solar panel array 114 includes individual solar panel assemblies 154, 156 and 158, each including three individual solar panels affixed together in an aluminum structural frame and configured with solar panel assemblies 154 and 158 configured to deploy or slide out from center solar panel assembly 156 where they are nested when not in use. Each solar panel 154, 156 and 158 includes a serpentine elongate heater (such as heater 90 of FIG. 1), but not shown here to simplify depiction. Optionally, such heater can be eliminated. More particularly, a slider frame 136 similar to frame 36 in FIG. 2 and that shown in U.S. Pat. No. 10,630,103 enables stacking (in storage) and deployment of solar panel assemblies 154, 156 and 158 during use. Solar panel assembly 158 slides laterally and upwardly from atop solar panel assembly 156 above cargo carrier 116 and solar panel assembly 156 slides laterally and downwardly from beneath solar panel assembly 156. Slider frame 136 is affixed atop rooftop 120 of van 112. When deployed, solar panels 154, 156 and 158 present an enlarged vertical solar presentation area than when stowed, or stacked for collecting solar energy.

FIG. 9 is a simplified partial front view of the vehicle roof mounted articulating, stowable, and deployable heated solar panel array and cargo carrier rack assembly 110 atop vehicle 112 and showing the solar panel array 114 deployed and the cargo carriers (including carrier 116) both stowed from an articulating roof rack assembly 122. Each cargo carrier, or cargo box (such as box 116) is supported by rack assembly 122 via a pair of parallel transport frame members, such as transport frame member 124 (and transport frame members 126, 128 and 130 (see FIG. 12). A substantially horizontally extending rectangular tubular aluminum cross tube 142 is provided by a substantially horizontal expansible frame member 138. A similar substantially vertically extending rectangular tubular aluminum cross tube 144 is provided by a substantially vertical expansible frame member 140. A substantially horizontal shelf tube member 150 extends from a bottom end of vertical expansible (or expandible) frame member 140 configured to support one end of each cargo carrier, such as cargo carrier 116.

FIG. 10 is a simplified partial front view of the vehicle roof mounted articulating, stowable, and deployable heated solar panel array and cargo carrier rack assembly 110 atop vehicle 112 and showing the solar panel 114 array deployed and the cargo carriers (including carrier 116) laterally deployed from an articulating roof rack assembly 122. More particularly, an inner horizontal rectangular cross sectional tube 146 is configured to slidably mate within outer rectangular cross sectional tube 142 of substantially horizontal expansible frame assembly 138 on transport frame member 124. Substantially horizontal shelf tube member 150 is shown raised relative to substantially vertically extending rectangular tubular aluminum cross tube 144 of substantially vertical expansible frame assembly 140. In this configuration, cargo carrier, or box 116 is shown deployed laterally out from under deployed solar panel array 114, but prior to being lowered as shown in FIG. 11 below. Such configuration provides sufficient access to open cargo carrier 116.

FIG. 11 is a simplified partial front view of the vehicle roof mounted articulating, stowable, and deployable heated solar panel array and cargo carrier rack assembly 110 atop vehicle 112 and showing the solar panel array 114 deployed and the cargo carriers (including carrier 116) and shelf member 150 laterally and vertically deployed, or lowered in order to facilitate opening of cargo carrier, or box 116 from an articulating roof rack assembly 122. Such articulation laterally and vertically is responsive to a need for greater access room into cargo box 116 especially when solar panel array 114 is fully deployed and is further lowered to gain further ease of access to each cargo carrier 116 and 118 (see FIG. 12). Inner tube 146 is extended laterally out from outer tube 142 of frame member 138 on transport frame member 124, and inner tube 148 is extended downwardly out from outer tube 144 of frame member 140. Tubes 142 and 146 of substantially horizontal expansible frame assembly 138 are extended, or deployed, and tubes 144 and 148 of substantially vertical expansible frame assembly 140 are also extended, lowering shelf member 150 and carrier 116.

Figures 12, 13:
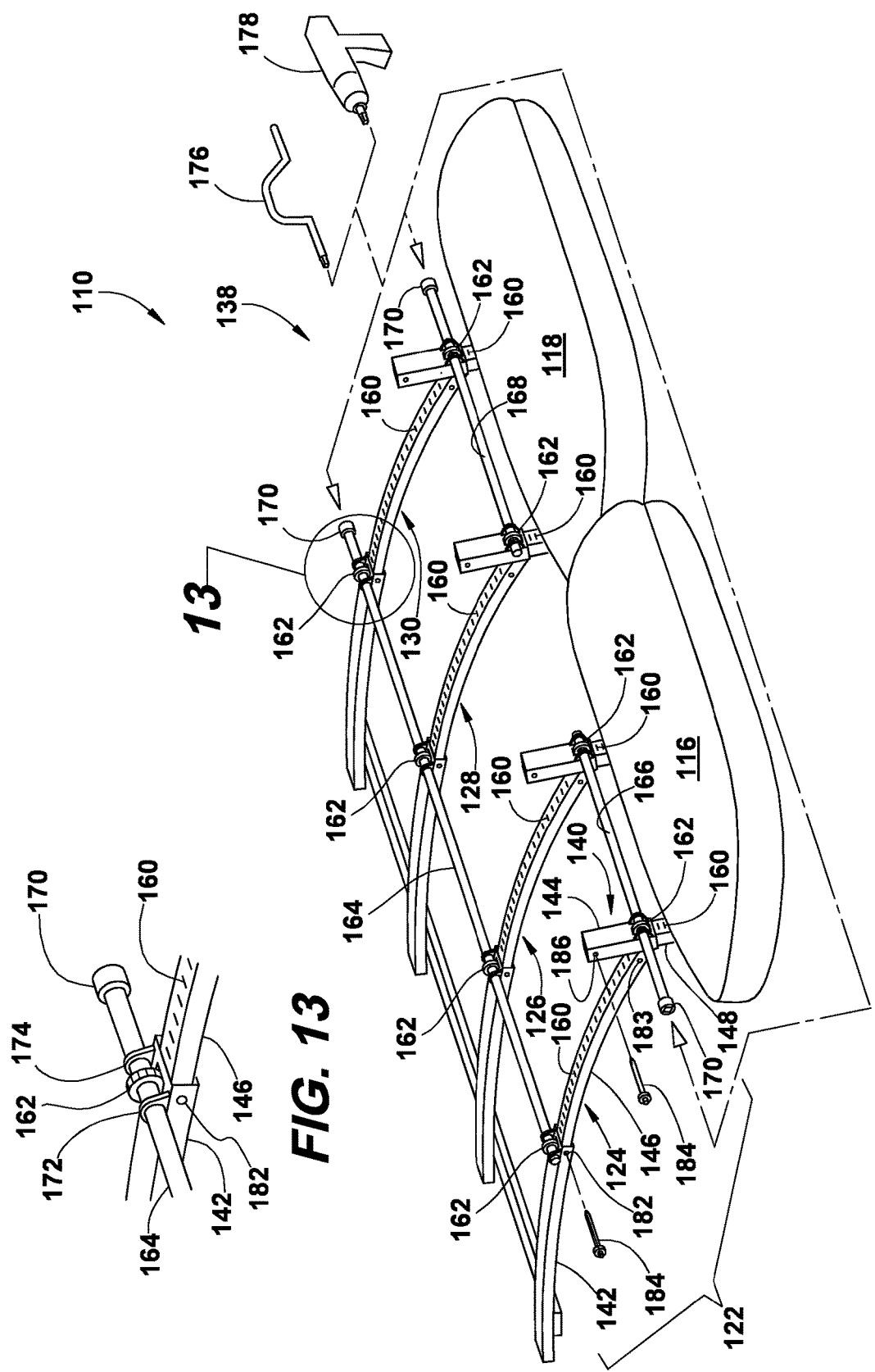
FIG. 12 is an enlarged partial perspective rooftop view of the cargo carrier assembly omitting the solar panel array and showing the cargo carrier laterally and vertically deployed as depicted in FIG. 11.
FIG. 13 is an enlarged partial perspective view from encircled region 13 of FIG. 12 showing in greater detail the gear and track translation mechanism for deploying the cargo carrier.

FIG. 12 is an enlarged partial perspective rooftop view of the vehicle roof mounted articulating, stowable, and deployable heated solar panel array and cargo carrier rack assembly 110 with the vehicle removed and showing the cargo carriers 116 and 118 each laterally and vertically deployed as depicted in FIG. 11. Articulating roof rack assembly 122 serves to both laterally and vertically move cargo carriers, or boxes 116 and 118 to provide for both access and clearance relative to a deployed solar panel array 114 (not shown to facilitate viewing, See FIG. 11). Cargo carrier 116 is movably supported by transport frame members 124 and 126, while cargo carrier 118 is movably supported by transport frame members 128 and 130.

As shown in FIG. 12, members 124, 126, 128 and 130 of substantially horizontal expansible frame assembly 138 each comprise an outer tube 142 and a slidable inner tube 146 forming a substantially horizontal expansible frame assembly 138. Inner tube 146 comprises a rectangular cross section aluminum tube having an array of individual gears teeth 160 formed in an upper surface to provide a gear rack. Members 124, 126, 128 and 130 are extended and retraced using a cylindrical drive shaft 164 carried by U-bolts 172 and 174 (see FIG. 13) on an outward end of each tube 142. Four spaced-apart cylindrical toothed gears 162 are configured to engage with each linear gear rack via individual gear teeth 160 formed on a top surface of each inner tube 146 via complementary gear teeth 160 formed as stamped depressions in tube 146. A female hexagonal drive head 170 on shaft 164 is configured to mate with a complementary motor drive male hexagonal head bit on a portable drill 178 configured in operation to extend and retract members 124, 126, 128 and 130. Optionally, a hand crank 176 with such a male hexagonal head bit can be used to manually extend and retract such members 124, 126, 128 and 130. Further optionally, an onboard electric motor (coupled to a vehicle wiring harness) can be used to drive such members 124, 126, 128 and 130. An outboard end of each tube 142 has a pair of aligned holes 182 configured to receive a ball lock fastener 184, or other fastener through a corresponding hole in each tube 146 at either an inboard end (e.g., 182) or an outboard end (e.g., hole 183) to enable locking of tube 146 in retracted and extended positions, respectively, for each of members 124, 126, 128 and 130. It is understood that a linear version of frame members 124, 126, 128 and 130 (see FIG. 8) can be incorporated into slider frame 136 as an optional construction to enable manual or powered slide out and stowage of solar panels 154 and 158 relative to stationary solar panel 156.

Members of substantially vertical expansible frame assembly 140 each comprise an outer tube 144 and a slidable inner tube 148. Inner tube 148 comprises a rectangular cross section aluminum tube having an array of individual gears 160 formed in an outer surface. A pair of drive shafts 166 and 168 are mated, or affixed to tubes 144 each with a pair of U-bolts. Each drive shaft 166 and 168 has a pair of cylindrical drive gears 162 configured to engage with a linear gear rack on inner tube 148 formed by gears 160 stamped as depressions in an outer face of tube 148. A female hexagonal drive head 170 on shafts 166 and 168 is configured to mate with a motor drive male hexagonal head bit on a portable drill 178 to extend and retract members 140. Optionally, a hand crank 176 can be used to manually extend and retract such members 140. Further optionally, an onboard electric motor can be used to drive such members 140 electrically couple to a vehicle wiring harness. A top end of each tube 144 has a pair of aligned holes 186 configured to receive a ball lock fastener 184, or other threaded fastener through a corresponding hole in tube 148 of each member 140 at either a top end (e.g., 186) or a bottom end (not shown) to enable locking of tube 148 in raised and lowered positions, respectively, for each member 140.

FIG. 13 is an enlarged partial perspective view from encircled region 13 of FIG. 12 showing in greater detail the gear 162 and track, or gear rack 160 that forms a translation mechanism for deploying a cargo carrier. More particularly, stamped gear teeth 160 provide a linear (slightly curved) gear rack on a top surface of inner tube 146 that is slidably received within outer tube 142. Brackets, or U-bolts 172 and 174 affix drive shaft 164 onto a distal end of outer tube 142 and maintain gear 162 in rotating engagement with teeth 160 on tube 146. Hole 182, provided on opposed faces of outer tube 142, is configured to receive a retaining fastener, or pin (not shown) that affixes inner tube 146 relative to outer tube at both fully extended and retracted positions (with corresponding holes, not shown). A corresponding pair of holes are provided in tube 146 at inner and outer ends that match fastener 184 (see FIG. 12) with holes 182 to lock tube 146 within tube 142 at extended and retracted positions. Drive head 170 is provided on a distal end of drive shaft 164 at a location where it is accessible by a user when mounted atop a vehicle.

Also as shown in FIG. 1-11, each solar panel can be heated with an elongate heater 90 (see FIG. 1) that forms a serpentine path about the solar panel. Such a heater can be formed from any of a number of elongate heaters, such as rope heaters having a linear elongate heater tube having a plastic outer tube, such as a PTFE high temperature tube with an inner Nichrome (or Nichromium) resistance heating wire. In one case, the rope heater is a heat generating resistance wire having an elongate encasement comprising a cover segment of plastic (such as polytetrafluoroethylene (PTFE)), such as a thin round cross-section PTFE tubing, having an inner cavity of thermally transmissive, temperature mitigating, and electrically insulative material encompassing the elongate heating wire contained within the inner cavity. Optionally, a such a tube can have Indium Tin Oxide coating in an inner bore of the tube, or a Positive Temperature Coefficient (PTC) heating element within the bore. Such outer tube can also be filled with an epoxy or other filler material that increases thermal mass. Such tube can also take on any of a number of shapes, or cross-sections including round, elliptical, square, rectangular, tear drop, web-shaped, or any other suitable configuration for carrying and encasing the core heating element (Nichrome wire, Indium Tin Oxide inner coating, or PTC heater). Further optionally, strips, webs, circuitous paths, or tracks of Indium Tin Oxide or Positive Temperature Coefficient (PTC) heater material can be used to form elongate heaters about PV modules in an array. Further details of one suitable construction for an elongate heater are readily understood in the art and detailed in U.S. Pat. No. 11,231,171, incorporated by reference herein in its entirety.

According to one construction, an electrically conductive, yet partially resistive, PTC ink for generating a trace is available as Loctite brand ECI 8000 E & C Series (including ECI 8120 PTC printable ink) from Henkel Corporation 14000 Jamboree Road, Irvine, CA 92606, United States. Optionally, a trace of indium tin oxide can be used. Further optionally, any other form of ink PTC traces can be used.

A method is provided for deploying a solar panel array with a cargo carrier, comprising: providing an articulating platform frame, a solar panel, and a cargo carrier; articulating the platform frame to raise the solar panel and the cargo carrier to a moved position; and presenting the solar panel to receive solar energy.

It is understood that each version of heated solar panel assembly shown in FIGS. 1-11 can benefit from use of electrically resistive heating elements in the form of relatively thin and flat circuit traces that are placed in proximity to solar PV modules or thin PV membranes. Such printed heating elements comprise one or more layers of a specialized electrically conductive and selectively resistive PTC (positive temperature coefficient) liquid ink applied to one or more surfaces of selected substrate materials within the complete heated solar panel assembly.

Using such liquid ink (or otherwise semi-liquid or hot-melt applied ink-like materials) that either dry, semi-harden or otherwise solidify, further provides for various methods of manufacture. Manufacturing methods may include, but not be limited to, circuit trace image printing or silk-screening methods for example.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

I claim:

1. A vehicle deployable solar power unit and cargo carrier assembly, comprising:
   an articulating frame;
   a solar panel carried by the articulating frame moveable between a stowed position and a deployed position; and
   a cargo carrier supported by the articulating frame movable relative to the solar panel to prevent access interference between the cargo carrier and the solar panel in the deployed position.

2. The vehicle deployable solar power unit and cargo carrier assembly of claim 1, further comprising a heater provided on the solar panel configured to mitigate condensate occlusion on a receiving surface of the solar panel.

3. The vehicle deployable solar power unit and cargo carrier assembly of claim 1, further comprising a storage battery configured to receive and store electricity collected from the solar panel.

4. The vehicle deployable solar power unit and cargo carrier assembly of claim 1, wherein the cargo carrier is a cargo box.

5. The vehicle deployable solar power unit and cargo carrier assembly of claim 1, wherein the articulating frame comprises a slider frame configured to slide apart a plurality of stacked solar panels into a deployed unstacked adjacent array of individual solar panels.

6. The vehicle deployable solar power unit and cargo carrier assembly of claim 5, wherein the articulating frame further comprises a pair of spaced apart and parallel substantially horizontal expansible frame assemblies and a pair of spaced apart and parallel substantially vertical expansible frame assemblies each having a substantially horizontal shelf tube member configured to carry a cargo box.

7. The vehicle deployable solar power unit and cargo carrier assembly of claim 1, wherein the articulating frame comprises at least one of: movement in a substantially horizontal direction; and movement in a substantially vertical direction configured to provided access room to the cargo carrier relative to the solar panel when in a deployed position.

8. The vehicle deployable solar power unit and cargo carrier assembly of claim 1 wherein the cargo carrier articulates between an open position and a closed position necessitating movement of the cargo carrier relative to the solar panel when deployed to provide greater access room to the open cargo carrier.

9. The vehicle deployable solar power unit and cargo carrier assembly of claim 8, wherein the cargo carrier is a cargo box articulated between closed and open positions to facilitate access to items stored therein.

10. The vehicle deployable solar power unit and cargo carrier assembly of claim 9, wherein the cargo carrier is configured to retain cargo and is articulated to facilitate access to the cargo relative to the solar panel when in a deployed position.

11. A vehicle deployable solar power unit and cargo carrier assembly, comprising:
    an articulating frame;
    a solar panel carried on and deployed by the articulating frame between a stowed position and a deployed position; and a cargo carrier supported by the articulating frame movable relative to the solar panel to enable access to the cargo carrier when the solar panel is in the deployed position.

12. The vehicle deployable solar power unit and cargo carrier assembly of claim 11, wherein the solar panel is an array of nested solar panels movable relative to one another from a stowed position having a minimal solar panel collection surface to a deployed position having an enlarged solar panel collection surface.

13. The vehicle deployable solar power unit and cargo carrier assembly of claim 11, further comprising an elongate heater provided in heat transfer relation with a top surface of the solar panel configured to mitigate condensate occlusion from the top surface of the solar panel.

14. The vehicle deployable solar power unit and cargo carrier assembly of claim 13, further comprising a battery coupled with the heater and the solar panel and configured to deliver power to the heater.

15. The vehicle deployable solar power unit and cargo carrier assembly of claim 14, wherein the cargo carrier is a cargo box.

16. The vehicle deployable solar power unit and cargo carrier assembly of claim 11, wherein the articulating frame comprises a slider frame and a plurality of solar panels are stacked within the slider frame configured to deploy the solar panels into an unstacked position having an enlarged solar collection surface over the stacked position.

17. The vehicle deployable solar power unit and cargo carrier assembly of claim 16, wherein the slider frame comprises a substantially horizontal expansible frame assembly and a substantially vertical expansible frame.

18. A method of deploying a solar panel array with a cargo carrier, comprising:
   providing an articulating platform frame, a solar panel carried by the platform frame, and a cargo carrier carried by the platform frame;
   articulating the platform frame to deploy the solar panel from a stowed position to a deployed position;
   articulating the cargo carrier to a deployed position relative to the solar panel to provide access to the cargo carrier; and
   presenting the solar panel to receive solar energy.

19. The method of claim 18, wherein the solar panel is one of a plurality of nested solar panels, and wherein articulating the platform frame to deploy the solar panel comprises sliding apart a plurality of nested solar panels to expose each solar panel top surface to receive solar energy.

20. The method of claim 19, further comprising heating the solar panel top surface to mitigate condensation occlusion on the top surface of the solar panel.

* * * * *